United States Patent [19]

Wathelet

[11] Patent Number: 4,777,380
[45] Date of Patent: Oct. 11, 1988

[54] METHOD OF SWITCHING THE ELECTRIC SUPPLY BETWEEN INDEPENDENT LOAD CIRCUITS

[75] Inventor: Daniel Wathelet, Richelle-Vise, Belgium

[73] Assignee: Thomson-CSF, Paris, France

[21] Appl. No.: 827,218

[22] Filed: Feb. 5, 1986

Related U.S. Application Data

[63] Continuation of Ser. No. 580,106, Feb. 14, 1984.

[30] Foreign Application Priority Data

Feb. 22, 1983 [FR] France .................... 83 02838

[51] Int. Cl.⁴ .................................................. H02M 3/28
[52] U.S. Cl. ........................................ 307/41; 307/66;
307/264; 307/265; 307/17; 378/108; 363/126; 363/41
[58] Field of Search ................ 307/17, 29, 31, 34, 307/35, 38, 39, 40, 41, 46, 47, 48, 51, 52, 57, 58, 59, 64, 66, 82, 83, 84, 85, 86, 87, 105, 106, 107, 108, 109, 260, 264, 265, 266, 267, 282; 328/60, 64, 65, 66, 67, 69, 70, 74, 80, 89; 378/91–115; 363/16, 26, 126, 41

[56] References Cited

U.S. PATENT DOCUMENTS

| | | | |
|---|---|---|---|
| 3,034,062 | 5/1962 | Bleam | 328/65 X |
| 3,076,902 | 2/1963 | Duzer et al. | 307/265 X |
| 3,103,602 | 9/1963 | Holmes et al. | 307/264 X |
| 3,110,810 | 11/1963 | Fransen | 378/115 |
| 3,333,104 | 7/1967 | Bougle | 378/96 X |
| 3,449,574 | 6/1969 | Duffy | 378/96 |
| 3,569,818 | 3/1971 | Dahlinger | 307/17 X |
| 3,819,980 | 6/1974 | Mullersman | 307/66 X |
| 3,894,235 | 7/1975 | Franke | 378/96 |
| 3,936,719 | 2/1976 | Miyoshi et al. | 363/126 |
| 4,221,968 | 9/1980 | Franke | 378/101 X |
| 4,251,847 | 2/1981 | Pagel et al. | 361/91 |
| 4,309,612 | 1/1982 | Aichinger | 378/108 |
| 4,313,055 | 1/1982 | Richter et al. | 378/97 |
| 4,322,817 | 3/1982 | Kuster | 363/41 X |
| 4,331,876 | 5/1982 | Amtmann et al. | 378/106 |
| 4,355,884 | 10/1982 | Honda et al. | 307/17 X |
| 4,378,501 | 3/1983 | Cowell | 378/97 |
| 4,520,494 | 5/1985 | Arita et al. | 378/108 |
| 4,532,644 | 7/1985 | Yamaguchi et al. | 378/106 X |
| 4,587,606 | 5/1986 | Sanada | 378/104 X |

FOREIGN PATENT DOCUMENTS 1253754  11/1967  Fed. Rep. of Germany.
2648309  4/1978  Fed. Rep. of Germany.

Primary Examiner—William M. Shoop, Jr.
Assistant Examiner—Paul Ip
Attorney, Agent, or Firm—Roland Plottel

[57] ABSTRACT

A method of and circuit for applying an electronic supply to two independent load circuits. An AC generator has a variable cyclic ratio. It is connected to two parallel rectifying circuits which are in series respectively with the two loads. The cyclic ratio of the alternating signal from the generator is altered. Thus, modifying the power delivered to each of the loads, because the rectifying circuits only rectifies one alternation of the complete AC signal from the generator. The power from the generator may be delivered to one or the other load or even to both load simultaneously.

16 Claims, 1 Drawing Sheet

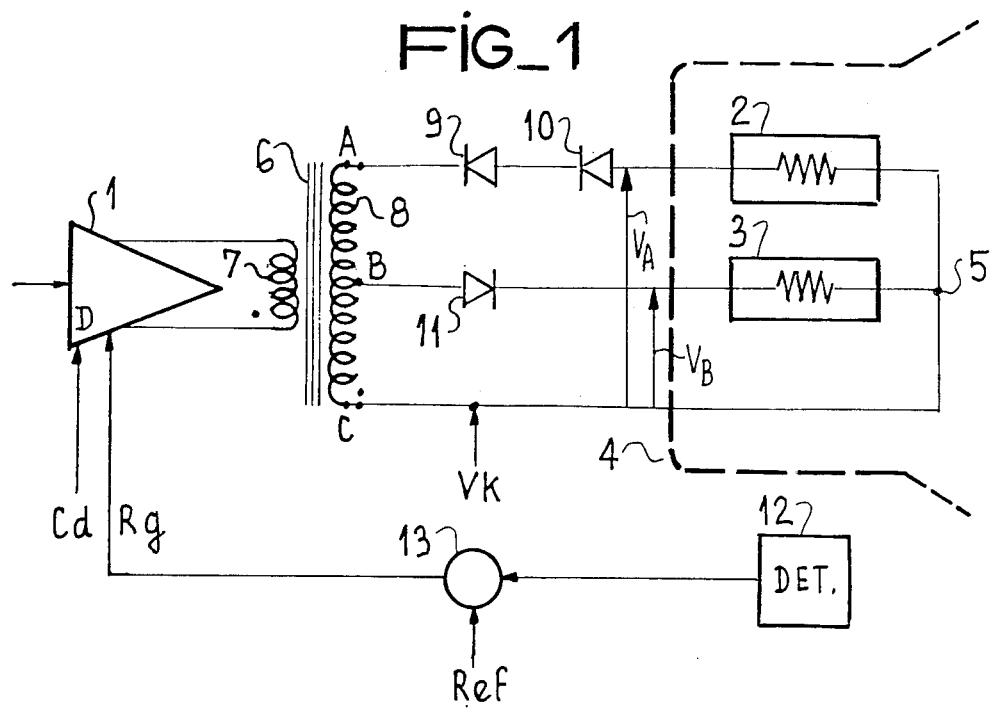
FIG_1
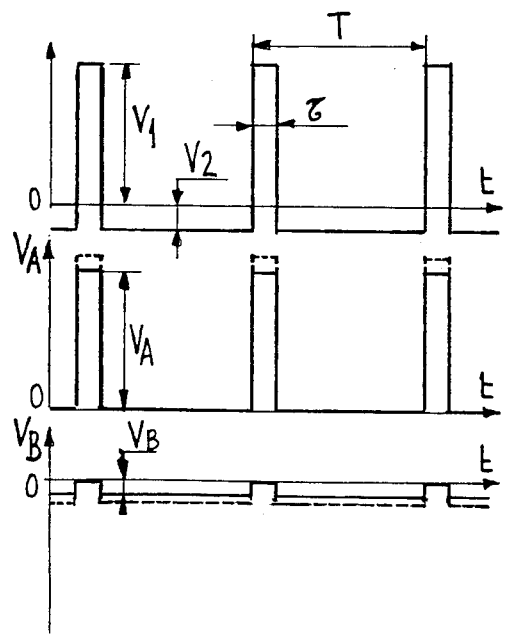
FIG_2.A
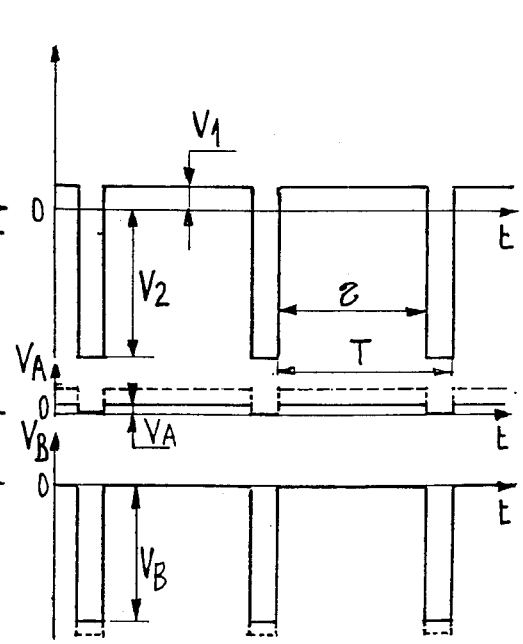
FIG_2.B

METHOD OF SWITCHING THE ELECTRIC SUPPLY BETWEEN INDEPENDENT LOAD CIRCUITS

This is a continuation of application Ser. No. 580,106, filed Feb. 14, 1984.

BACKGROUND OF THE INVENTION

The invention relates to a method of switching the electric supply between two independent load circuits, applicable in particular to X-ray tubes utilised in modern radiology.

The radiological applications most widely known, particularly in the medical sphere, are radioscopy and radiography. An object or a patient is exposed to the radiation of an X-ray tube in these two applications, and the image of the attenutation of the beam of rays after traversal through the object is picked up. The X-rays pass through the object for protracted periods in radioscopy. In the medical sphere, the intensity of this radiation is low in such a manner as not to expose the patient to a protracted harmful irradiation. In radiography, the intensity of the X-rays is high but its period is short. This procedure has the result of effectively exposing the photographic plate which records the image whilst refraining from subjecting the object or the patient to an excessive irradiation due to the briefness of this single pulse.

The X-ray tubes able to radiate one of these two radiations as desired have a single complete structure as a common body, in particular comprising an anode, focussing devices, control devices, and a mechanical tube envelope. Switching circuits act on a cathode array of this tube. A selection is made in this manner, as needed, of a cathode emitting few or numerous electrons, such that an emission of low or high intensity X-rays respectively is produced when these electrons strike the anode. The control device of the tube commonly comprises means such that the cathode polarisation may be cancelled rapidly in a radiography application.

In practice, the cathode array of the tube comprises two cathodes. These cathodes currently comprise filaments heated up by direct heating by passing an electric heating current through these filaments. For the purpose of limiting the electrical connectons which must pass through the tube envelope, it is known that these filaments may be connected to a common point which also serves the purpose of applying the polarising voltage to the cathode. This cathode array consequently comprises at least three connecting terminals. In this way, the polarising or biasing voltage is fed simultaneously to both the cathodes of the cathode array, but only that one of these cathodes which is exposed to a heating current is in operation. The known switching devices commonly comprise an electromechanical relay providing a choice, or else two different transformers, the switching operation then being performed at the level of the primary windings.

The insulation of this relay is difficult, since the cathodes are biased with respect to the earth of the apparatus by a voltage close to several tens of thousands of volts. The disruption problems which may arise between its armature and its terminals are difficult to resolve. Their lack of insulation raises a serious risk. Furthermore, generators of different electrical signals are frequently utilised to provide the heating of each of the two cathodes.

SUMMARY OF THE INVENTION

The invention has as its object to overcome the disadvantages referred to above by providing an original switching method which does not utilise an electromechanical contactor and which has recourse to a single generator of electrical signals and to a single transformer.

The invention relates to a method of switching the electric supply between two independent load cirucits, characterised in that the two load circuits are supplied respectively by the products of rectification of each of the alternations of an alternating signal and in that the cyclic ratio is controlled.

The invention also provides an electronic circuit comprising a generator of an alternating signal intended to provide an electric supply to two independent load circuits, characterised in that it comprises first rectifying means for rectifying one alternation of the signal of given sign and second means for rectifying the other alternation of the signal, of opposite sign to that of the first, the said means being connected respectively for supplying the two independent load circuits and in that the generator is a pulse generator of which the cyclic ratio of the pulses is adjustable.

BRIEF DESCRIPTION OF THE DRAWINGS

A clearer understanding of the invention will be gained and other features and advantages of the same will emerge during the following non-limiting description. This description is given with reference to the accompanying drawings in which identical elements are denoted by the same symbols references; and in which:

FIG. 1 shows one circuit arrangement for application of the method of the invention; and FIGS. 2A and 2B showing timing diagrams for electrical signals playing a part in the method of the invention.

DESCRIPTION OF THE INVENTION

FIG. 1 illustrates an electronic circuit comprising a generator 1 of an alternating signal, connected to rectifying means for feeding an electric supply to two loads 2 and 3 depicted in the form of electrical resistances. In accordance with the application proposed, this figure shows that these loads represent the cathodes of an X-ray tube 4. The loads are independent in this figure, since their terminals are not interconnected. The presence of a common terminal 5 is predicated by the production conditions referred to above for X-ray tubes. It will be explained in the following that this common terminal 5 is not essential to the operation of the method of the invention and that, in particular, the loads 2 and 3 may then be totally separate.

The means for rectifying the alternating signal supplied by the generator 1 comprises a transformer 6 and two diode circuits. The generator 1 is connected to the primary winding 7 of the transformer 6, the two diode circuits being connected in this example to two separate points of the secondary winding 8 of the transformer, namely points A and B. The secondary winding 8 may have a different number of turns or a different structure as compared to the winding 7, so that an increase and/or a reduction of the voltage produced by the generator 1 may possibly be obtained. A first circuit of diodes in series is connected between the point A and the load 2, the second circuit of diodes being conneced between the point B and the load 3. The waveforms of the electric signals supplied between the terminals A and C of this transformer are the same as those supplied between the terminals B and C. This being so, the fact that the polarities of the diode circuits may be reversed permits rectification of one only of the two alternations of the alternating signal of the generator in each of these diode circuits. The alternations rectified by each of the diode circuits are clearly different from each other.

Let the first diode circuit comprising the diodes 9 and 10 be that rectifying the positive alternation of the signal, since the cathodes of these diodes are situated towards the load 2 and their anodes towards the point A. It will be observed that the second diode circuit comprising the diode 11 rectifies the negative alternation of the signal since the cathode of its diode is situated towards the point B and its anode towards the load 3. If another embodiment is adopted for the secondary winding 8 of the transformer 6, it is obviously still possible to direct the diodes of the first diode circuit to a given polarity and the diodes of the second diode circuit to a polarity complementary to the first in order to enable rectification of the one and the other alternation, respectively. Furthermore, in the case in which the loads are independent, especially in respect of their polarisation, their independence is assured by establishing two electrically independent sections in the secondary winding of the transformer 6.

It is perfectly possible for the tappings A and B of the secondary winding 8 to be merged into a single point. It will be observed in the following how a modification of the cyclic ratio makes it possible, even in this configuration, to perform the switching of the electric supply between the load 2 and the load 3. The presence of the transformer 6 is then justified only by the application of a cathode biasing voltage VK to the common portion of the loads 2 and 3 representing cathodes of an X-ray tube in the example given. The transformer 6 then permits isolation of the generator 1 from this biasing voltage. Apart from this example, it is possible to omit the transformer 6 and to connect the diode circuits in parallel to one of the terminals of the generator.

FIGS. 2A and 2B illustrate the waveforms of a pulsed alternating signal measured at different points of the electronic circuit of the invention. In this case, these pulsed signals have a rectangular shape which renders the cylcic ratio concept more comprehensible. This rectangular shape of the signals is not however an essential condition for the operation of the method of the invention, and in particular, the flanks of these pulses may be less steep than those illustrated in FIGS. 2A and 2B. The top of these figures illustrate a pulsed alternating signal supplied by the generator 1, comprising a pulse of duration $\tau$ recurring cyclically with a period T. The D.C. component of this signal is zero. This amounts to stating that the ratio between the amplitudes V1/V2 of the positive and negative parts of this signal respectively, is equal to:

$$\frac{V1}{V2} = \frac{T - \tau}{\tau}$$

The lower part of these figures illustrates the signal supplied by the generator 1 and which had respectively undergone, signals VA and VB, the alternation rectifications imposed by the first and second diode circuits. These signals serve the purpose of supplying the loads 2 and 3 respectively.

FIGS. 2A and 2B are complementary. FIG. 2A illustrates signals having a low cyclic ratio, being of the order of 10% in this case, and FIG. 2B illustrates signals having a high cyclic ratio, of the order of 90% in this case. It may be shown by a simple calculation, that upon rectifying these two alternations, the effective value of the rectified signals is proportional to the square root of the energy dissipated by each of these two alternations in the loads, averaged over a cycle of the signal. The ratio between these effective values may then be written as a first approximation, as:

$$\frac{\text{Effective } V1}{\text{Effective } V2} = \sqrt{\frac{T - \tau}{\tau}}$$

Consequently, when the cyclic ratio $\tau/T$ is, for example, of the order of 10%, the ratio between the effective voltages is of the order of 3, and when the cyclic ratio is of the order of 90%, the same ratio between the effective voltage values is close to a $\frac{1}{3}$. This means that in the case of FIG. 2A, the energy dissipated in the load 2 is three times greater than the energy dissipated in the load 3. Conversely, in the case of FIG. 2B, the energy dissipated in the load 3 is three times greater than the energy dissipated in the load 2. In the case of an application of the invention to an X-ray tube, this 1 to 3 ratio is sufficient to differentiate between a hot filament and a cold filament. A hot filament is able to emit electrons, whereas a cold filament cannot emit electrons. The result of this modification of the cyclic ratio consequently acts to perform the selection between the cathode filaments intended for the required application: utilisation in radioscopy or radiography.

The ratio between the effective voltages is not however directly indicative of the energy expended in the loads 2 and 3. The explanation which has been given relates merely to a configuration in which the points A and B would coincide and in which the loads 2 and 3 would present an identical resistivity value. Under this assumption, the difference in thermoemissivity of the cathode filaments would then have to be obtained by differentiation of the thermoemissive materials forming these filaments. In practice, the filaments are produced from one and the same material, commonly based on tungsten, and the difference in thermoemissivity of the filaments is related to their size: the one is larger than the other. As a result, they present a different resistance to the heating current. This is the reason why the tappings A and B are not combined in the transformer 8. The tapping A corresponding to a large number of turns comprised between the point C and the point A, consequently supplies an alternating signal of greater amplitude than that of the signal supplied by the tapping B. As a result, the energy dissipated into the load 2 with a signal having a low cyclic ratio will be greater than the energy expended in the load 3 by a signal having a high cyclic ratio.

For a given cyclic ratio, the ratios between the energies expended are consequently proportional to the ratios between the effective voltages on the one hand, and on the other hand to the transformation ratios applied by the transformer 6 between the signals supplied at the point A and at the point B. However, if the cyclic ratio is high (FIG. 2B), for example of the order of 90%, this differentiation of the transformation ratios of the transformer 6 neutralises the selective effects obtained by means of the ratio of the effective values. This situation is easily remedied by interposing a particular number of diodes in the diode circuits.

Thus, the signal marked VA in FIG. 2A does not have V1 as its amplitude, but merely has as its amplitude the voltage V1 minus the voltage drop in the diodes 9 and 10 of the first diode circuit. This voltage drop is depicted by the dashed outlines. The voltage V1 is high since the cyclic ratio is low in this figure, so that this change has little effect. By contrast, in FIG. 2B, in which the voltage V1 is low, this change is proportionately very appreciable and it is even possible to cause cancellation of the voltage VA of FIG. 2B, by selecting the number of diodes of the first diode circuit.

The load 2 corresponds to the large cathode filaments utilised in radiography for which the thermoemissivity should be high. The load 3 represents a cathode filament utilised in radioscopy. Its resistive value is lower than that of the load 2. In the case of signals having low cyclic ratios (FIG. 2A), the voltage VB is not equal to the voltage V2 but equal to this voltage V2 reduced by the voltage drop applied by the diode 11. The neutralisation of this voltage VB is obtained with a lesser number of diodes in the second diode circuit as compared to the first circuit, since this voltage VB is obtained moreover with a lower transformation ratio than that with which the voltage VA had been obtained. With a higher cyclic ratio, as in FIG. 2B, this voltage VB undergoes little modification by the presence of a comparatively small number of diodes.

It is very clearly apparent that it is possible, in this manner, to provide a sufficient number of diodes in each of the two diode circuits to cancel, in each case, that of the two voltages which is unwanted. In an example, in which the signal supplied by the generator 1 has a variation of the order of 10 volts, in which the transformation ratio of the transformer 6 is 1 for the tapping A and ½ for the tapping B, and in which the diodes have the layout illustrated in FIG. 1, the signal VA and the signal VB are equal respectively to 7.6 volts and 0 volts. In the case of a high cyclic ratio, their values are respectively 0 volts and −3.8 volts. These values may easily be discovered, considering that the diodes are silicon diodes and each cause a voltage drop of the order of 0.7 volt. Based on this numerical example, it may consequently be grasped that it is possible to act on the amplitude of the signal supplied by the generator 1, on the transformation ratios established by the transformer, and on the number of diodes contained in each of the diode circuits in order to adapt the power dissipated in each of the two loads 2 and 3 as a function of the resistances of these loads.

A control input D has been shown symbolically in FIG. 1, which makes it possible to perform the switching of the supply to the loads by acting on the cyclic ratio of the pulses produced by this generator 1. It is possible to regulate the quantity of energy dissipated in the loads by incorporating a regulator loop comprising a detector 12 for detection of a value representing the quantity of energy dissipated in the load which is to be controlled. In the radioscopy application, this detector 12 may in particular comprise means for measuring the brightness of the image received on a video monitor forming part of this radioscopy array. The level of the video signal fed to this monitor is thus measured in practice, since this video signal is proportional to the quantity of X-ray radiation which had passed through the object or the patient, and is consequently proportional to the intensity of the heating current fed to the cathode of the tube 4 which is utilised for emission. The signal supplied by the detector 12 is fed to one of the inputs of a comparator 13 receiving a reference signal Ref at its other input. This comparator then generates an error signal Rg for corrective purposes. This signal Rg is fed in parallel with a control signal Cd to the control input D of the signal generator 1. In radiography, the control array will operate at the same rate as the regulator array for radioscopy, the reference quantity Ref being established by experience, and whilst making simultaneous allowance for the sensitivity of the photographic plates utilised and for the maximum acceptable irradiation for the patients.

Numerous types of signal generators having an adjustable cyclic ratio are available at present. In practice, these generators comprise a sawtooth generator, with T being the period of the sawteeth. The output signal of a comparator may be employed to produce the pulses recalled, by comparing the value of the sawtooth signal to a control value Cd in this comparator. The control voltage Rg may then simply be superimposed over the control voltage Cd to alter the cyclic ratio of the pulse about its initial setting value.

The method described and the electronic circuit applying the same may be utilised in numerous forms. Some of these variants have been described and relate in particular to the shape of the pulses, the presence of a transformer, and the form of the diode rectifying circuits. However others may still be invisaged which would mainly be characterised in that they utilise the modification of the cyclic ratio to perform the switching action. It may also be observed that the application of the method is still possible when it is merely desired to establish a balance between the energies expended in two electric load circuits.

I claim:

1. An electronic circuit comprising a generator of a periodically alternating signal whose cyclic ratio is adjustable to provide an electric supply to two separately independent load circuits, means for switching said electric supply between said independent load circuits, first rectifying means for rectifying one alternation of the signal of a given sign and second rectifying means for rectifying the other alternation of the signal of an opposite sign to that of the first, said first and second rectifying means being connected respectively for supplying the two independent load circuits, and means at the generator for adjusting the cyclic ratio of the alternating signal whereby the electric supply is effectively applied only to a selected one of the two load circuits.

2. A circuit according to claim 1, wherein said independent load circuits are formed by separate heating filaments of the same X-ray tube.

3. A circuit according to claim 2, wherein said first rectifying means comprises a first secondary winding of a transformer connected in series with at least one first diode of a given polarity to rectify one alternation of the signal and said second rectifying means comprises a second secondary winding of said transformer, connected in series with at least one second diode of a complementary polarity to rectify the other alternation of the signal.

4. A circuit according to claim 3, wherein said first secondary winding of said transformer is connected in series with two diodes.

5. A circuit according to claim 3, wherein said second secondary winding of said transformer is included in the first secondary winding.

6. A circuit according to claim 3, wherein said second secondary winding is merged with the first secondary winding.

7. A circuit according to claim 3, wherein said generator of an alternating signal is connected to the primary winding of the transformer.

8. A circuit according to claim 2, further comprising a regulator loop connected to a control for adjusting the cyclic ratio of the generator and receiving a signal representing the quantity of energy expended by the load which is to be controlled.

9. An application of the method according to claim 1, characterized in that it is implemented in an X-ray tube.

10. A method of switching electric power from an alternating electric supply between two independent load circuits comprising the steps of recitifying one alternation of said alternating signal and applying said rectifying signal to one of said load circuits; rectifying the other alternation of the alternating signal and applying said rectified signal to the other of said load circuits; and controlling the cyclic ratio of the alternating signal and thus switching and controlling the electric supply between the two load circuits.

11. A method of switching an alternating electric supply between two independent load circuits comprising the steps of:
  (a) rectifying separately the alternations of said alternating electric supply,
  (b) applying the rectified alternations of one sign to one load and the rectifying alternations of the other sign to the other load,
  (c) adjusting the cyclic ratio of the alternating signal and thus varying in opposite senses the amount of power supply supplied to each load, whereby the amount of power supplied is effective to energize only a selected one of the two load circuits.

12. An electronic circuit comprising a generator means of pulses providing alternating positive and negative pulses whose widths are adjustable, first means for rectifying the positive pulses for providing a first voltage, second means for rectifying separately the negative pulses for providing a second voltage, first and second separate load means connected to be supplied respectively with said first and second voltages, and means for varying the relative widths of the positive and negative pulses for varying oppositely the amplitudes of said first and second voltages.

13. An electronic circuit in accordance with claim 12 characterized in that the first means for rectifying comprises diode means poled in a first direction between the generator and the first load means and the second means for rectifying comprises diode means poled in the direction opposite said first direction between the generator and the second load means.

14. An electronic circuit in accordance with claim 13 in which the generator includes a transformer which includes a primary winding supplied with the alternating positive and negative voltages and a secondary winding including a first top connected to the first rectifying means whereby a first voltage is supplied and a second top connected to the second rectifying means whereby the second voltage supplied is different from the first voltage supplied.

15. An electronic circuit in accordance with claim 14 in which the diode means in the first rectifying means introduces a first voltage drop in the effective voltage supplied to the first load, the diode means in the second rectifying means introduces a second voltage drop different from the first voltage drop, in the effective voltage supplied to the second load means, the difference being such that the adjustment of the ratio of the widths of the positive and negative pulses may be used effectively to reduce below a prescribed threshold selectively either the first or the second voltage supplied whereby only a selected one of the two load means is effectively energized.

16. A method of selectively switching on only one of a pair of independent loads comprising the steps of
  providing a source of alternating positive and negative pulses the ratio of whose amplitudes are set and the ratio of whose widths are adjustable
  supplying the positive and negative pulses to two separate rectifying circuits each of which introduces a different prescribed voltage drop and each of which supplies its rectified voltage to a different one of the two independent loads, and
  varying the ratio of the widths of the positive and negative pulses for adjusting in opposite senses the amplitudes of the rectified voltages provided by the two separate rectifying circuits whereby only one of the amplitudes is sufficient for energizing its associated load.

* * * * *